No. 823,986. PATENTED JUNE 19, 1906.
E. S. BARTRAM.
CREAM REMOVER.
APPLICATION FILED NOV. 10, 1905.

Witnesses

Inventor
Eli S. Bartram,
By O'Meara & Brock
Attorneys

UNITED STATES PATENT OFFICE.

ELI S. BARTRAM, OF SELMA, ALABAMA.

CREAM-REMOVER.

No. 823,986.  Specification of Letters Patent.  Patented June 19, 1906.

Application filed November 10, 1905. Serial No. 286,755.

*To all whom it may concern:*

Be it known that I, ELI S. BARTRAM, a citizen of the United States, residing at Selma, in the county of Dallas and State of Alabama, have invented a new and useful Improvement in Cream-Removers, of which the following is a specification.

This invention relates to a device for removing cream which collects in the upper portions of milk-bottles; and the object of the device is to remove the cream without removing a portion of the milk with it, as it is difficult to remove the cream by pouring off the contents of the upper portion of the bottle without more or less of the milk being carried off with the cream or a considerable layer of cream being left in the bottle.

The invention consists of the novel features of construction hereinafter described, pointed out in the claims, and shown in the accompanying drawings, in which—

Figure 1:
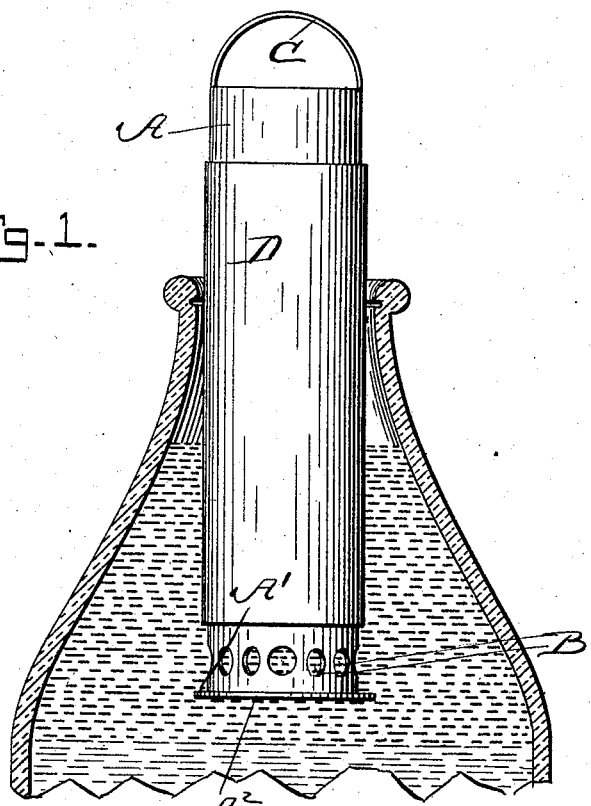
Figure 2:
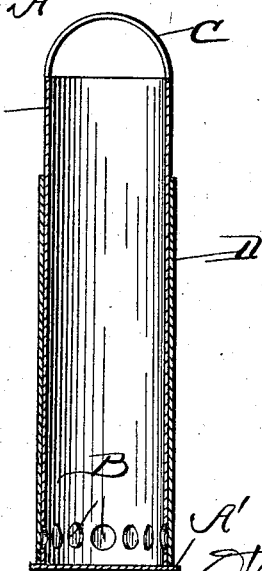

Figure 1 is a vertical elevation of my device shown in position in a milk-bottle, the bottle being shown in section and the device being shown in position to receive the cream. Fig. 2 is a vertical section taken longitudinally through my device, the inlet-openings through which the cream passes being shown closed.

The invention consists of a tube A, which is closed at the lower end and which is provided at its lower end with an exterior annular flange A', preferably formed by having a bottom plate A² of larger diameter than the tube A. Adjacent the bottom a plurality of apertures B are formed in the tube A and circumferentially arranged. A handle portion C is formed at the upper end of the tube A and preferably integral with the same. Sliding upon the tube A is a non-perforate sleeve D of less length than the tube A. In use the sleeve D is slipped upwardly, uncovering the apertures B, and the device is inserted into the neck of the milk-bottle and the cream flows into the tube A through the said apertures from all sides, as will be readily understood from Fig. 1 of the drawings. When the cream upon the inside of the tube A has risen to a level with that in the bottle, the sleeve D is moved downwardly and its lower end rests upon the flange A' and the sleeve closes all of the apertures B, and the device is then removed from the bottle and the cream poured into a suitable receptacle. The device can then be reinserted and the operation repeated until all of the cream in the bottle has been removed.

Having thus fully described my invention, what I claim as new, and desire to secure by Letters Patent, is—

1. A device of the kind described comprising a tube closed at its lower end and having a plurality of perforations adjacent the lower end of the tube, an annular exterior flange carried by the lower end portion of the tube, and a non-perforate sleeve sliding upon the tube and adapted to rest upon said flange.

2. A device of the kind described comprising a tube having a plurality of circumferentially-arranged perforations adjacent its lower end and closed at its lower end, a handle portion at the upper end of the tube, an exterior flange at the lower end of the tube and a non-perforate sleeve of less length than the tube, the said sleeve sliding upon the tube and closing all perforations of the tube when its lower end is resting upon the flange.

ELI S. BARTRAM.

Witnesses:
 J. HINCHFIELD,
 G. F. OBENLAND.